United States Patent [19]
Althoff

[11] 3,710,190
[45] Jan. 9, 1973

[54] FAULT CURRENT PROTECTIVE CIRCUIT FOR A LOAD SUPPLIED FROM SINGLE OR POLYPHASE SYSTEMS

[75] Inventor: F. Dankward Althoff, Milwaukee, Wis.

[73] Assignee: Brown Boveri & Cie AG, Mannheim, Germany

[22] Filed: Feb. 7, 1972

[21] Appl. No.: 223,920

[30] Foreign Application Priority Data

Feb. 13, 1971 Germany..................P 21 06 879.1

[52] U.S. Cl..............317/18 D, 317/27 R, 317/40 R, 317/150
[51] Int. Cl................................................H02h 3/28
[58] Field of Search..........317/18 D, 27 R, 40 R, 150

[56] References Cited

UNITED STATES PATENTS

| | | | |
|---|---|---|---|
| 3,535,590 | 10/1970 | Mayer | 317/18 D |
| 3,614,533 | 10/1971 | Douglas et al. | 317/18 D |
| 3,633,070 | 1/1972 | Vassos et al. | 317/18 D |

Primary Examiner—James D. Trammell
Attorney—John J. McGlew et al.

[57] ABSTRACT

The protective circuit has a summation current transformer whose secondary winding has an auxiliary AC voltage applied thereto and is connected in series with a release, such as the operating coil of a circuit breaker. The auxiliary AC voltage has the same frequency as a main's phase and is generated by a voltage source having a low internal resistance. The secondary winding of the transformer is dimensioned so that its impedance, with the transformer core magnetically unsaturated, is at least of the same order as the impedance of the release, and the internal resistance of the auxiliary voltage source, with the transformer core magnetically saturated, is low relative to these impedances. The auxiliary voltage source may be part of a voltage divider connected between one phase and either a neutral conductor or another main, and the voltage divider may comprise a condenser and a resistance. The release may be designed as a relay which is pre-polarized by an electromagnet excited by rectification from the same phase as the auxiliary AC voltage. Various additional circuit modifications may be made.

10 Claims, 6 Drawing Figures

FAULT CURRENT PROTECTIVE CIRCUIT FOR A LOAD SUPPLIED FROM SINGLE OR POLYPHASE SYSTEMS

FIELD OF THE INVENTION

This invention relates to fault current protective circuits for loads supplied from single phase or polyphase systems and, more particularly, to a new, improved, simplified and less expensive fault current protective circuit.

BACKGROUND OF THE INVENTION

In many electrical installations, present specifications require that the currents flowing from a load directly to ground, or which take a return path other than that through the neutral conductor, must not exceed a certain threshold value as, otherwise, the operating crew will be in danger. This threshold value is in the range of several milliamperes.

In order to detect such fault currents, it is known, in the case of alternating fault currents, to lead the mains phases and the neutral conductor through a summation current transformer. Since the sum of all currents traversing the summation current transformer is zero at each moment, no magnetic flux is induced in its core, so that no voltage can be induced in the secondary winding of the transformer. If a fault current appears, the sum of all currents flowing through the transformer is not equal to zero, and a voltage or current appears in the secondary winding and is used to actuate the release for a safety switch, if necessary after corresponding amplification. In this connection, see German DAS 1,082,337. In this instance, the summation current transformer operates as a transformer. However, such systems are not suitable for detecting direct or unidirectional fault currents.

Another fault current protective circuit is based on the principle of a non-linear variable choke or saturable reactor, and likewise uses a summation transformer with a secondary winding which is supplied with an auxiliary AC voltage. If the sum of all currents in the transformer is zero, the impedance of the secondary winding is high and only a small current flows therethrough, and is insufficient to release a series-connected release device. If a direct or unidirectional fault current now flows, the transformer core is saturated magnetically and the impedance of the secondary winding drops abruptly. A larger current can flow through the secondary winding, and is sufficient to actuate the series-connected release.

German DAS 1,140,275 discloses a fault current protective circuit operating on the non-linear variable choke or saturable reactor principle, and which also responds to alternating fault currents. However, this fault current protective circuit works independent of the phase position, and thus reliably, only when the frequency of the mains phases and the frequency of the AC voltage source applied to the secondary winding are unequal. It is therefore suggested in this German disclosure, not to supply a current of the fundamental frequency to the secondary winding, but to derive the supply voltage for the secondary winding from the third harmonic. For this purpose, phase converters are used and represent a considerable expenditure.

SUMMARY OF THE INVENTION

The invention provides a fault current protective circuit which responds reliably both to direct fault currents and to alternating currents, requires no active structural elements like thyristors, transistors and the like, and which is much less expensive than known protective circuits of the type in question. The invention fault current protective circuit is based on such a circuit having a summation current transformer whose secondary winding is supplied with an auxiliary AC voltage and is connected in series with a release. In accordance with the invention, the auxiliary AC voltage has the same frequency as the mains frequency, or phase frequency, and is generated by a voltage source with a low internal resistance. The secondary winding of the summation transformer is dimensioned so that its impedance, with a magnetically unsaturated transformer core, is at least of the same order as the impedance of the release, while the internal resistance of the auxiliary voltage source, with the transformer core magnetically saturated, is low in comparison with these impedances.

The auxiliary voltage source may be designed as a voltage divider connected between one phase and either the neutral conductor or another main, and the expenditure is particularly low when this voltage divider comprises a condenser and a resistance. In order to make sure, in this arrangement, that the fault current protective circuit works reliably also in a phase failure, and thus in the absence of the auxiliary AC voltage, it is advisable to use, as a release, a relay pre-polarized by an electromagnet whose excitation current is obtained by rectification from the same phase as that supply in the auxiliary AC voltage.

An object of the present invention is to provide an improved fault current protective circuit for loads supplied from a single phase or polyphase network.

Another object of the invention is to provide such a fault current protective circuit in which an auxiliary AC voltage, applied to the secondary winding of a summation current transformer, has the same frequency as the phase frequency.

A further object of the invention is to provide such a fault current protective circuit in which the auxiliary AC voltage is generated by a voltage source having a low internal resistance.

For an understanding of the principles of the invention, reference is made to the following description of typical embodiments thereof as illustrated in the accompanying drawing:

DESCRIPTION OF THE PREFERRED EMBODIMENTS

Figure 1:
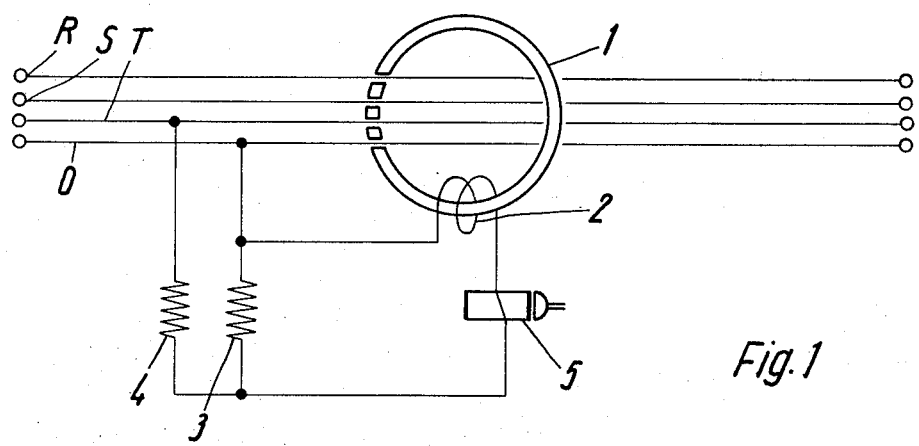
FIG. 1 is a schematic wiring diagram illustrating the basis circuitry of the invention protective circuit.

FIG. 1 illustrates the principal circuit arrangement of a fault current protective circuit embodying the invention, and on which all embodiments of the invention are based. A transformer core 1, which can be designed as a winding tape core of a highly permeable material preferably having a rectangular characteristic, has a secondary winding 2. Core 1 is traversed by the three phase conductors R, S and T and by the neutral conductor O. A voltage divider, comprising resistances 3 and 4 is connected between one phase and the neutral conductor, with resistance 4 being very high as compared to resistance 3. Secondary winding 2 is connected in series with a release 5, and a series connection of winding 2 and release 5 is in parallel with resistance 3.

In normal operation, when there is no fault current, a small alternating current flows through the circuit of secondary winding 2, release 5 and resistance 3. However, this current is so small, on the basis of the impedance of secondary winding 2, with an unsaturated transformer core, that it does not attain the threshold value of the release.

When an alternating fault current appears, a voltage is induced in secondary winding 2, so that a current can flow therethrough and through release 5 and resistance 3, this current exceeding the threshold value of the release. The release then acts on an interrupter or circuit breaker, which has not been shown, and the load is disconnected. In the case just described, the summation current transformer acts as a transformer.

When a direct fault current appears, such as can be caused, for example, by apparatus working with phase cutting control, the transformer core 1 is magnetically saturated. The impedance of secondary winding 2 thus becomes so low that the current flowing from the voltage divider through release 5 is now sufficient to activate release 5. It is thus possible to disconnect the load from the mains. In this case, the summation current transformer acts as a non-linear variable choke or saturable reactor.

It can be seen thus that it is possible to dimension a fault current protective circuit, with a summation current transformer, so that the transformer can operate as a transformer or as such a choke or saturable reactor. This is surprising, and has not been recognized by the prior art.

Figure 2:
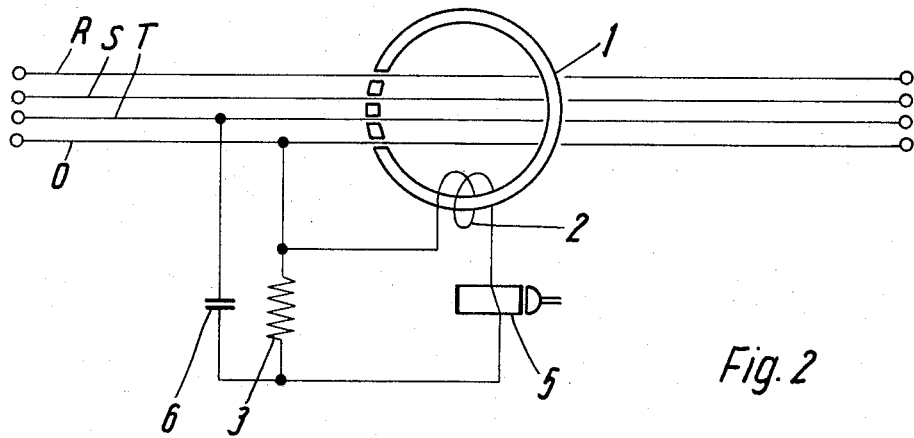
FIG. 2 is a schematic wiring diagram illustrating the voltage divider as including a resistance and a condenser.

The embodiment of the invention shown in FIG. 2 differs from that shown in FIG. 1 in that resistance 4 is replaced by a condenser 6. A protective circuit embodying the invention as illustrated in FIG. 2, and which works satisfactorily, was dimensioned in the following manner. The capacity of condenser 6 was 0.5 muF, the size of resistance 3 was 0.4 ohm., and the resistance of release 5 was about 3 ohms. The core 1 of the transformer had an outside diameter of about 24 mm and an inside diameter of about 12 mm. Secondary winding 2 of the transformer comprised 4 turns and its impedance, at 50 cycles in the unsaturated state, was 5 to 6 ohms. The circuit arrangement was released reliably by fault currents of the order of about 10 mA.

It should be noted that the release threshold of the circuit arrangement is subject to fluctuations, which is not surprising since the release threshold depends on the phase relation of the auxiliary AC voltage and a fault current. These fluctuations are so insignificant, however, that they are much smaller than the response tolerances of 100 percent legally permitted.

The embodiments described above thus work as a non-linear variable choke or saturable reactor, in the case of direct fault currents, and as a transformer, in the case of alternating fault currents, so that they can no longer respond to direct fault currents if the phase, from which the auxiliary AC voltage is derived, fails. It therefore is frequently advisable to provide measures such that the circuit arrangement responds even in the case of the phase failure, because even in a phase failure, the sum of all alternating currents flowing through the transformer core can remain zero. One possibility consists in taking the auxiliary AC voltage through a voltage divider network from not only one phase but from several phases. This has not been shown since it requires only routine skill on the basis of the knowledge of the principal circuit as shown in FIGS. 1 and 2.

Figure 3:
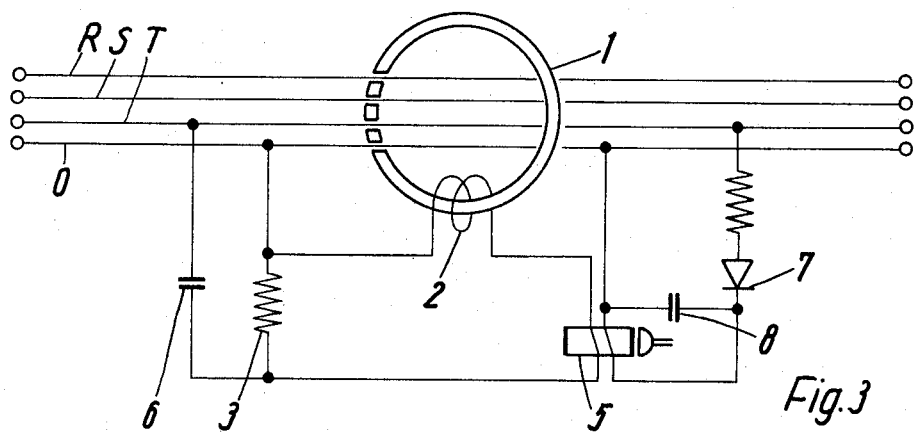
FIGS. 3, 4, 5 and 6 are schematic wiring diagrams illustrating other modifications of the invention.

The embodiment of the invention shown in FIG. 3 has the possibility of obtaining a reliable protection against the failure of the auxiliary AC voltage. This embodiment differs from that shown in FIG. 2 in that a relay is used as a release 5, and this relay is prepolarized by means of an electromagnet. The excitation of the electromagnet is derived from phase T through a rectifier 7 and a smoothing condenser 8, the auxiliary AC voltage also being derived from phase T through condenser 6 and resistance 3. It requires only routine skill to design relay 5 so that it trips when the exciter current fails.

Figure 4:
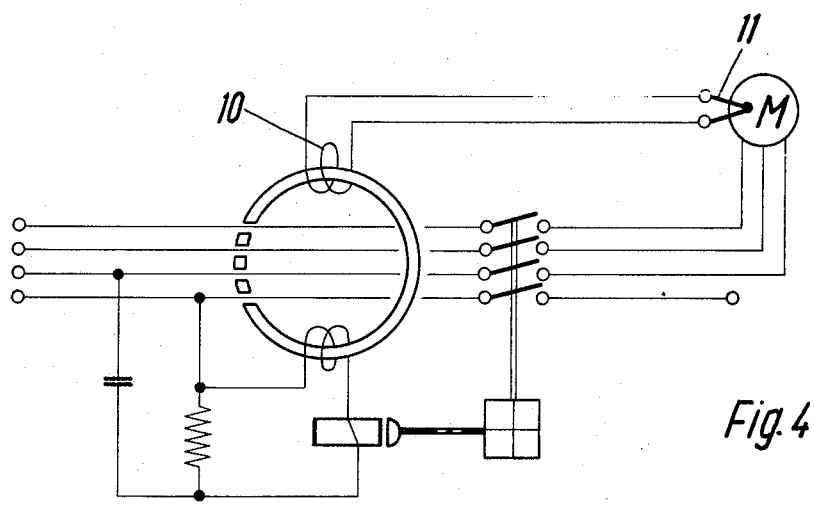

It has already been mentioned that the summation current transformer can also work on the principle of a non-linear variable choke or saturable reactor. This results in additional advantageous possibilities with an auxiliary control winding 10 as shown in FIG. 4. For example, the core of the summation current transformer can be provided with auxiliary control winding 10 and this winding can be excited by the current from a thermocouple 11 which is arranged, for example, inside an electric motor or at any other point at which the temperature should not exceed a certain value. If the thermoelectric current becomes so great that the transformer core becomes saturated, disconnection is effected in the same manner as in the case of a direct fault current.

It would be imaginable that a direct fault current and, at the same time, local overheating appear due to the fault effected by the direct current, so that the direct fault current and the thermoelectric current possibly compensate each other. However, this is not likely because the plants or apparatus to be monitored always have a certain thermal inertia so that an exact simultaneous onset of direct fault currents and of thermoelectric current is not to be expected.

Figure 5:
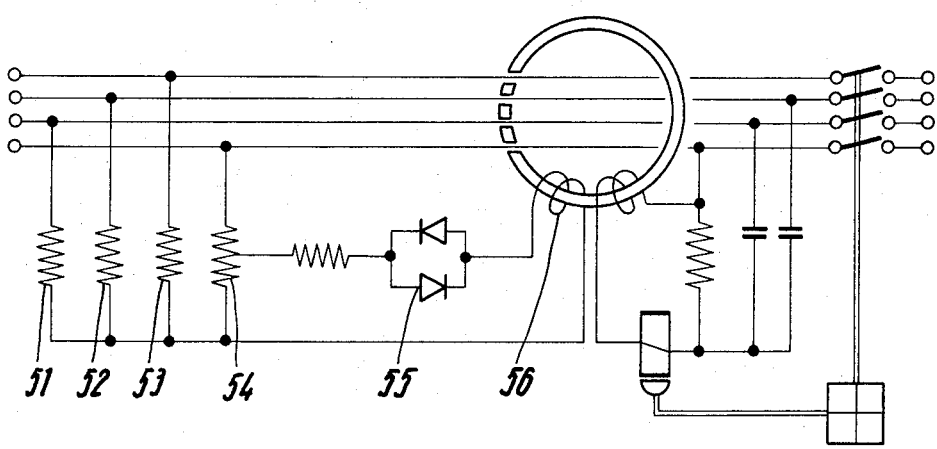
Figure 6:
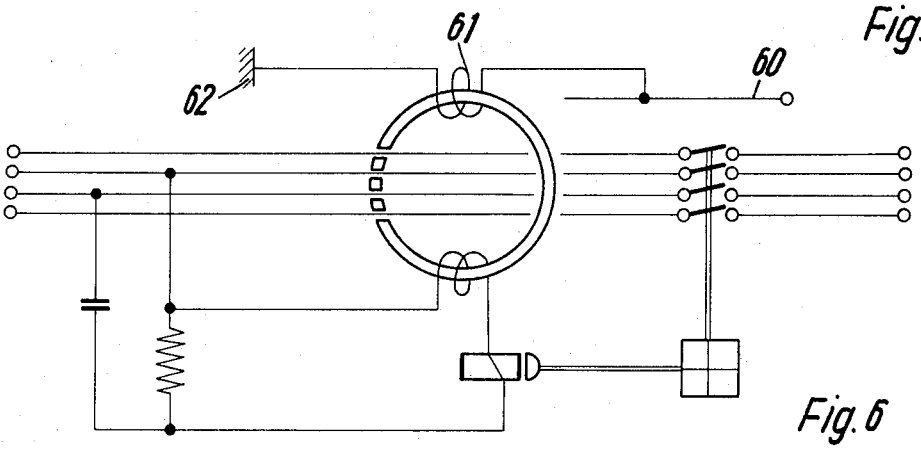

The fault current protective circuit of the invention can be further modified by additional auxiliary control windings on the transformer core, as shown in FIGS. 5 and 6. FIG. 5 illustrates how protection against a phase failure can be attained. For this purpose, an artificial neutral point is produced by means of impedances 51, 52 and 53 and by means of potentiometer 54. A certain voltage is tapped on potentiometer 54 and applied to auxiliary control winding 56. In a phase failure, an alternating current is produced in auxiliary AC control winding 56, so that the fault current protective circuit releases in the same manner as in the case of an alternating fault current. The two oppositely polarized parallel connected diodes 55 are not necessary, in principle. They are used as a threshold value switch in order to prevent false releases, which could occur with minor dissymmetries. The remaining circuit arrangement corresponds to the embodiments already described.

FIG. 6 illustrates a monitored protective conductor system. A protective conductor 60 is connected to ground through an auxiliary control winding 61 on the transformer core. If potential differences appear between protective conductor 60 and ground, a current flows in auxiliary control winding 61, so that the fault current protective circuit responds again, and a DC or AC potential is applied to the protective conductor. The remaining circuit arrangement corresponds to those already described. The embodiment of the invention shown in FIG. 6 therefore can be used as a combined fault current and fault voltage protective circuit.

Naturally, it is also possible to combine the various described embodiments. By arranging, for example, a number of auxiliary control windings on the transformer core, there can be obtained, at the same time, protection against direct fault currents and alternating fault currents, against phase failure, against fault voltages and against thermal overloads. Protection against excess voltage and undervoltage also is possible if resistance elements, with suitably selected resistance characteristics, are arranged, for example, in the corresponding circuits for the auxiliary control windings. The fault current protective circuit of the invention thus can be readily extended to a full protective circuit without any difficulties and without major additional expenses.

While specific embodiments of the invention have been shown and described in detail to illustrate the application of the principles of the invention, it will be understood that the invention may be embodied otherwise without departing from such principles.

What is claimed is:

1. In a fault current protective circuit for loads supplied from single or polyphase systems, and including a summation current transformer with a transformer core and whose secondary winding has an auxiliary AC voltage applied thereto and is connected in series with a release, the improvement comprising, in combination, said auxiliary AC voltage having the same frequency as a mains phase, and being generated by a voltage source having a low internal resistance; the secondary winding of said summation current transformer being dimensioned so that its impedance, with said transformer core magnetically unsaturated, is at least of the same order as the impedance of said release; the internal resistance of said auxiliary voltage source, with said transformer core magnetically saturated, being low relative to said aforementioned impedances.

2. In a fault current protective circuit, the improvement claimed in claim 1, in which said auxiliary voltage source comprises part of a voltage divider connected between one phase and the neutral conductor.

3. In a fault current protective circuit, the improvement claimed in claim 2, in which said voltage divider comprises a condenser and a resistance.

4. In a fault current protective circuit, the improvement claimed in claim 2, in which said release is a relay; and an electromagnet pre-polarizing said relay.

5. In a fault current protective circuit, the improvement claimed in claim 4, in which said electromagnet is excited by rectification from the same phase as that to which said voltage divider is connected.

6. In a fault current protective circuit, the improvement claimed in claim 1, including an impedance network connected to said mains and to a neutral or to another main and creating an artificial neutral point; and an additional auxiliary control winding on said transformer core connected to taps of said impedance network in a manner such that, in case of a phase failure, a current activating the fault current protective circuit will flow.

7. In a fault current protective circuit, the improvement claimed in claim 1, in which the load has a separate protective conductor; said separate protective conductor being connected to an auxiliary ground through an additional auxiliary control winding on said transformer core.

8. In a fault current protective circuit, the improvement claimed in claim 1, including additional auxiliary control windings on said transformer core operable to activate said protective circuit by other fault indicating currents.

9. In a fault current protective circuit, the improvement claimed in claim 8, in which said auxiliary control windings are responsive to currents from thermocouples.

10. In a fault current protective circuit, the improvement claimed in claim 6, including a pair of diodes connected in parallel with each other, with opposed polarity, in series between a tap and said auxiliary control winding and serving as a threshold value switch preventing false releases.

* * * * *